United States Patent
Mizokami (10) Patent No.: US 10,903,760 B2
(45) Date of Patent: Jan. 26, 2021

(54) POWER CONDITIONER

(71) Applicant: OMRON Corporation, Kyoto (JP)

(72) Inventor: Takao Mizokami, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/792,280

(22) Filed: Feb. 16, 2020

(65) Prior Publication Data

US 2020/0287477 A1  Sep. 10, 2020

(30) Foreign Application Priority Data

Mar. 5, 2019  (JP) .................................. 2019-039755

(51) Int. Cl.
*H02M 7/5387* (2007.01)
*H02M 1/12* (2006.01)

(52) U.S. Cl.
CPC ....... *H02M 7/53871* (2013.01); *H02M 1/126* (2013.01)

(58) Field of Classification Search
CPC .......... H02M 7/42; H02M 7/53; H02M 7/537; H02M 7/5387; H02M 7/53871; H02M 7/53873; H02M 1/126
See application file for complete search history.

(56) References Cited

U.S. PATENT DOCUMENTS

| | | | | |
|---|---|---|---|---|
| 10,840,814 B2 * | 11/2020 | Kusama | ................ | H02M 1/083 |
| 2012/0155126 A1 * | 6/2012 | Yoneda | ................... | H02M 1/14 363/40 |
| 2017/0279372 A1 * | 9/2017 | Sakakibara | ........... | H02M 5/458 |
| 2018/0034403 A1 * | 2/2018 | Kim | ........................ | H02P 27/06 |
| 2018/0183317 A1 * | 6/2018 | Nakahara | ................ | H02M 7/48 |
| 2020/0235664 A1 * | 7/2020 | Takei | ..................... | H02M 1/32 |

FOREIGN PATENT DOCUMENTS

| | | |
|---|---|---|
| JP | 2002-010496 | 1/2002 |
| TW | 201427248 | 7/2014 |
| TW | 201539966 | 10/2015 |
| TW | 201715813 | 5/2017 |
| TW | 201820765 | 6/2018 |

OTHER PUBLICATIONS

"Office Action of Taiwan Counterpart Application", dated Nov. 5, 2020, with English translation thereof, pp. 1-8.

* cited by examiner

*Primary Examiner* — Adolf D Berhane
(74) *Attorney, Agent, or Firm* — JCIPRNET (57) ABSTRACT

The power conditioner includes: a reactor; a capacitor; a first switching circuit that alternately switches, at a first frequency, between a first state where the DC current supplied from the DC power source is supplied to the reactor and supply of the DC current to the capacitor is shut off and a second state where an electric current is supplied to the capacitor from the reactor in which energy is accumulated by the supply of the DC current and the electric current from the DC power source to the reactor is shut off; and a second switching circuit that alternately switches, at a second frequency, between a first direction in which an electric current supplied from the capacitor flows toward a second output terminal through a first output terminal and a second direction in which the electric current flows toward the first output terminal through the second output terminal.

8 Claims, 9 Drawing Sheets

POWER CONDITIONER

CROSS-REFERENCE TO RELATED APPLICATION

This application claims the priority benefit of Japan Application No. 2019-039755, filed on Mar. 5, 2019. The entirety of the above-mentioned patent application is hereby incorporated by reference herein and made a part of this specification.

BACKGROUND OF THE DISCLOSURE

Technical Field

The disclosure relates to a power conditioner.

Related Art

A power conditioner that converts DC power into AC power has been used, the DC power being supplied from a DC power source such as a solar cell or an energy capacitor system (EcaSS). For example, patent literature 1 discloses a power conditioner that steps up, in a step-up circuit, DC power supplied from a solar cell to accumulate the stepped-up power in a capacitor and that steps down, in an inverter circuit, a voltage accumulated in the capacitor to generate AC power.

LITERATURE OF RELATED ART

Patent Literature

[Patent literature 1] Japanese Patent Laid-Open No. 2002-010496

In the technology disclosed in patent literature 1, respective reactors are arranged at both the step-up circuit and the inverter circuit. In other words, the power conditioner disclosed in patent literature 1 includes a plurality of reactors. The reactor is a component around which an iron wire is wound and thus is a component that is difficult to have a reduction in size and has a heavy weight. Therefore, the power conditioner is inhibited from being reduced in size and weight.

According to an aspect of the technology of the disclosure, a more small-sized and light-weight power conditioner is provided.

SUMMARY

An aspect of the technology of the disclosure is exemplified by a power conditioner described below. The power conditioner converts a DC current from a DC power source into an AC current and outputs the AC current from an output terminal. The power conditioner includes: a reactor; a capacitor; a first switching circuit that alternately switches, at a first frequency, between a first state where the DC current supplied from the DC power source is supplied to the reactor and supply of the DC current to the capacitor is shut off and a second state where an electric current is supplied to the capacitor from the reactor in which energy is accumulated by the supply of the DC current and the electric current from the DC power source to the reactor is shut off; and a second switching circuit that alternately switches, at a second frequency, between a first direction in which an electric current supplied from the capacitor flows toward a second output terminal through a first output terminal and a second direction in which the electric current flows toward the first output terminal through the second output terminal.

DESCRIPTION OF THE EMBODIMENTS

Hereinafter, an embodiment is described with reference to the drawings.

Embodiment

Figure 1:
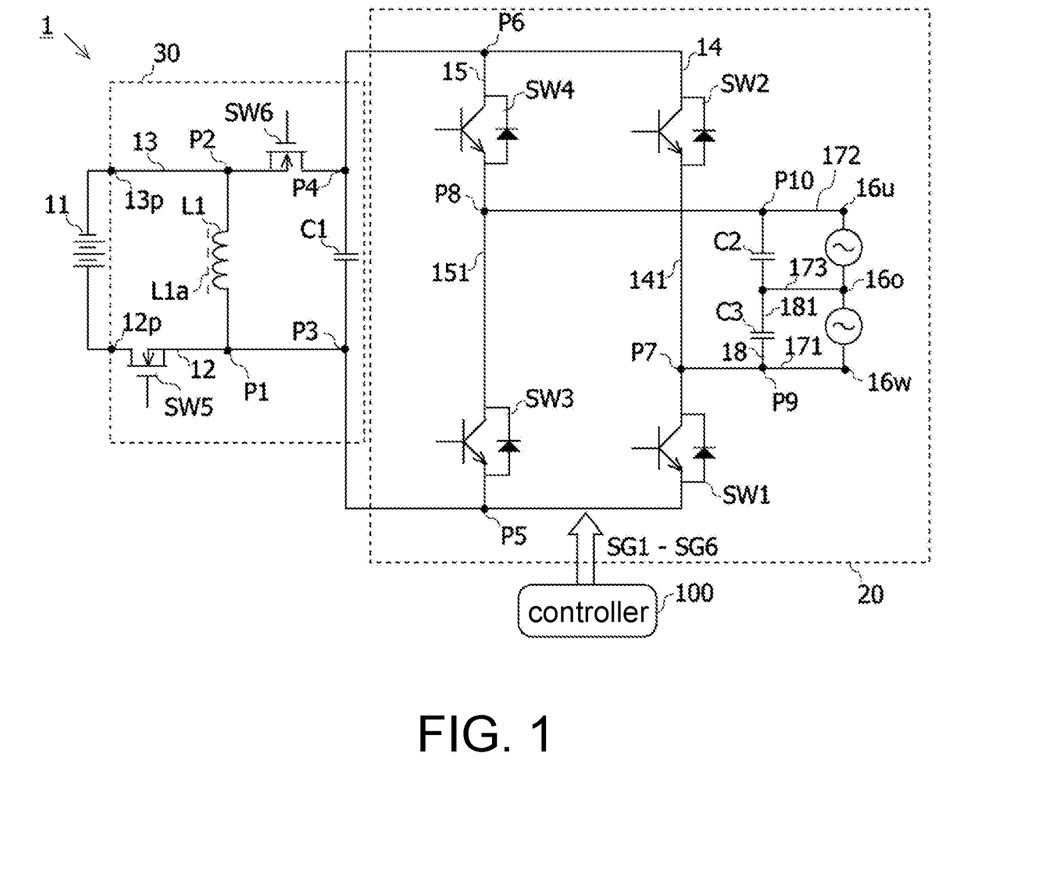
FIG. 1 is a diagram illustrating an example of a configuration of a power conditioner according to an embodiment.

FIG. 1 is a diagram illustrating an example of a configuration of a power conditioner according to an embodiment. A power conditioner 1 illustrated in FIG. 1 converts DC power from a DC power source 11 into AC power having a predetermined frequency and output the AC power. For example, the predetermined frequency is a commercial frequency (50 Hz or 60 Hz). Hereinafter, the power conditioner according to the embodiment is described with reference to FIG. 1.

The power conditioner 1 includes a step-up/step-down circuit 30 and a bridge circuit 20. The step-up/step-down circuit 30 has a plus terminal 12$p$ that is connected to a plus-side terminal of the DC power source 11 and a minus terminal 13$p$ that is connected to a minus-side terminal of the DC power source 11. The bridge circuit 20 has a u-terminal 16$u$, an o-terminal 16$o$, and a w-terminal 16$w$ which are single-phase three-wire type output terminals that output electric power converted into the alternating current. A plus wire 12 is connected to the plus terminal 12$p$, and a minus wire 13 is connected to the minus terminal 13$p$.

(Bridge Circuit 20)

In the bridge circuit 20, a first leg 14 and a second leg 15 are connected between the plus wire 12 and the minus wire 13. The first leg 14 connects a first switching element SW1 and a second switching element SW2 in series. The second leg 15 connects a third switching element SW3 and a fourth switching element SW4 in series. A connection position between the second leg 15 and the plus wire 12 is a connection point P5, and a connection position between the second leg 15 and the minus wire 13 is a connection point P6. The second leg 15 is disposed closer to the DC power source 11 than the first leg 14.

In the first leg 14, the first switching element SW1 is disposed at a side of the plus wire 12, and the second switching element SW2 is disposed at a side of the minus wire 13. In the first leg 14, the first switching element SW1 and the second switching element SW2 are connected to each other in series. The first switching element SW1 is an example of a "first switching element". The second switching element SW2 is an example of a "second switching element".

The first leg 14 is an example of a "first leg".

In the second leg 15, the third switching element SW3 is disposed at the side of the plus wire 12, and the fourth switching element SW4 is disposed at the side of the minus wire 13. In the second leg 15, the third switching element SW3 and the fourth switching element SW4 are connected to each other in series. The third switching element SW3 is an example of a "third switching element". The fourth switching element SW24 is an example of a "fourth switching element". The second leg 15 is an example of a "second leg".

(Step-Up/Step-Down Circuit 30)

In the step-up/step-down circuit 30, a capacitor C1 is disposed between the plus wire 12 and the minus wire 13 and is disposed closer to the DC power source 11 than the second leg 15. In other words, the capacitor C1 is disposed between the connection point P5 and the plus-side terminal of the DC power source 11 and between the connection point P6 and the minus-side terminal of the DC power source 11. A connection position between the capacitor C1 and the plus wire 12 is a connection point P3, and a connection position between the capacitor C1 and the minus wire 13 is a connection point P4. The capacitor C1 is an example of a "capacitor". The connection point P4 is an example of a "third connection point".

A reactor L1 is disposed between the plus wire 12 and the minus wire 13 and is disposed closer to the DC power source 11 than the capacitor C1. In other words, the reactor L1 is disposed between the connection point P3 and the plus-side terminal of the DC power source 11 and between the connection point P4 and the minus-side terminal of the DC power source 11. A connection position between the reactor L1 and the plus wire 12 is a connection point P1, and a connection position between the reactor L1 and the minus wire 13 is a connection point P2. For example, the reactor L1 is an iron-core reactor in which a coil is formed around a magnetic core L1$a$. The reactor L1 is an example of a "reactor". The connection point P1 is an example of a "first connection point". The connection point P2 is an example of a "second connection point".

On the plus wire 12, a fifth switching element SW5 is disposed between the DC power source 11 and the reactor L1. On the minus wire 13, a sixth switching element SW6 is disposed between the reactor L1 and the capacitor C1. The fifth switching element SW5 is a switching element that is turned on when power from the DC power source 11 is supplied to the reactor L1. In addition, the sixth switching element SW6 is a switching element that is turned on when energy accumulated in the reactor L1 is supplied to the capacitor C1.

The fifth switching element SW5 and the sixth switching element SW6 operate reversely from each other. In other words, when the fifth switching element SW5 is turned on and the power is supplied to the reactor L1, the sixth switching element SW6 is turned off and power supply to the capacitor C1 is shut off. In addition, when the sixth switching element SW6 is turned on and the energy accumulated in the reactor L1 is supplied to the capacitor C1, the fifth switching element SW5 is turned off and power supply from the DC power source 11 to the reactor L1 is shut off.

The fifth switching element SW5 is an example of a "fifth switching element". The sixth switching element SW6 is an example of a "sixth switching element". A state where the fifth switching element SW5 is turned on and the power is supplied to the reactor L1, and the sixth switching element SW6 is turned off and the power supply to the capacitor C1 is shut off is an example of a "first state". A state where the sixth switching element SW6 is turned on and the energy accumulated in the reactor L1 is supplied to the capacitor C1, and the fifth switching element SW5 is turned off and the power supply from the DC power source 11 to the reactor L1 is shut off is an example of a "second state".

A first in-leg wiring 141 is a wiring which connects the first switching element SW1 and the second switching element SW2 to each other in the first leg 14. A second in-leg wiring 151 is a wiring which connects the third switching element SW3 and the fourth switching element SW4 to each other in the second leg 15. A first output wire 171 which is connected to the w-terminal 16$w$ is connected to the first in-leg wiring 141 at a connection point P7. A second output wire 172 which is connected to the u-terminal 16$u$ is connected to the second in-leg wiring 151 at a connection point P8. The first output wire 171 is an example of a "first output wire". The second output wire 172 is an example of a "second output wire". The u-terminal 16$u$ is an example of a "first output terminal". The w-terminal 16$w$ is an example of a "second output terminal".

A third leg 18 that connects a capacitor C2 and a capacitor C3 in series is disposed between the first output wire 171 and the second output wire 172. The capacitor C2 and the capacitor C3 have the same capacitance. A connection position between the third leg 18 and the first output wire 171 is a connection point P9, and a connection position between the third leg 18 and the second output wire 172 is a connection point P10. In the third leg 18, a third output wire 173 which is connected to the o-terminal 16$o$ is connected to a third in-leg wiring 181 at a connection point P11, the third in-leg wiring 181 connecting the capacitor C2 and the capacitor C3 to each other. The third leg 18 is an example of a "smoothing circuit". The step-up/step-down circuit 30 is an example of a "first switching circuit". The bridge circuit 20 is an example of a "second switching circuit".

A controller 100 controls ON and OFF of the switching elements SW1 to SW6 by supplying control signals SG1 to SG6. The control signal SG1 is a signal used for switching between ON and OFF of the first switching element SW1. The control signal SG2 is a signal used for switching between ON and OFF of the second switching element SW2. The control signal SG3 is a signal used for switching between ON and OFF of the third switching element SW3. The control signal SG4 is a signal used for switching between ON and OFF of the fourth switching element SW4. The control signal SG5 is a signal used for switching between ON and OFF of the fifth switching element SW5. The control signal SG6 is a signal used for switching between ON and OFF of the sixth switching element SW6.

Figure 2:
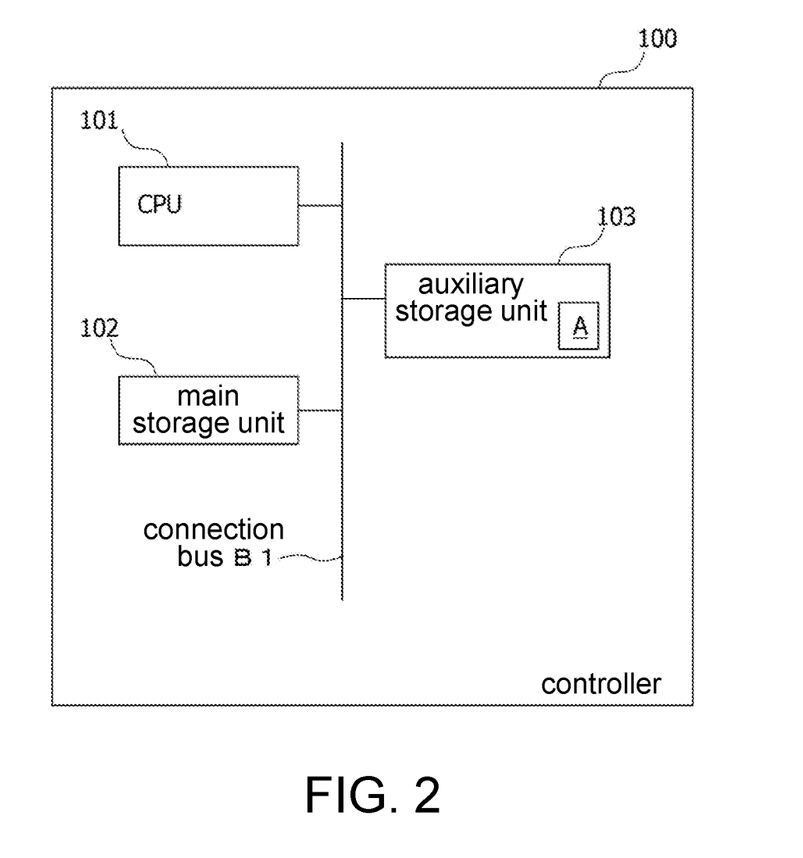
FIG. 2 is a diagram illustrating an example of a hardware configuration of a controller.

FIG. 2 is a diagram illustrating an example of a hardware configuration of the controller. The controller 100 includes a central processing unit (CPU) 101, a main storage unit 102, an auxiliary storage unit 103, a communication unit 104, and a connection bus B1. The CPU 101, the main storage unit 102, the auxiliary storage unit 103, and the communication unit 104 are connected to one another via the connection bus B1.

The CPU 101 is not limited to a single processor and may have a multi-processor configuration. The CPU 101 may be a combination of a processor and an integrated circuit, which is exemplified by a microcontroller unit (MCU), a system on chip (SoC), a system LSI, a chipset, or the like.

The main storage unit 102 and the auxiliary storage unit 103 are a recording medium which is readable by the controller 100. The main storage unit 102 is exemplified as a storage unit that is directly accessed from the CPU 101. The main storage unit 102 has a random access memory (RAM) and a read only memory (ROM).

The auxiliary storage unit 103 is, for example, a non-volatile storage unit which is exemplified by an erasable programmable ROM (EPROM), a solid state drive (SSD), a hard disk drive (HDD), or the like. The auxiliary storage unit 103 stores a program A executed for controlling the switching elements SW1 to SW6.

In the controller 100, the CPU 101 develops, in a work area of the main storage unit 102, the program A stored in the auxiliary storage unit 103 and controls the switching elements SW1 to SW6 through execution of the program.

FIG. 3 to FIG. 6 are diagrams illustrating examples of an operation of the power conditioner according to the embodiment. In FIG. 3 to FIG. 6, thick arrows exemplify a flow orientation of an electric current. Hereinafter, the operation of the power conditioner 1 according to the embodiment is described with reference to FIG. 3 to FIG. 6.

Figure 3:
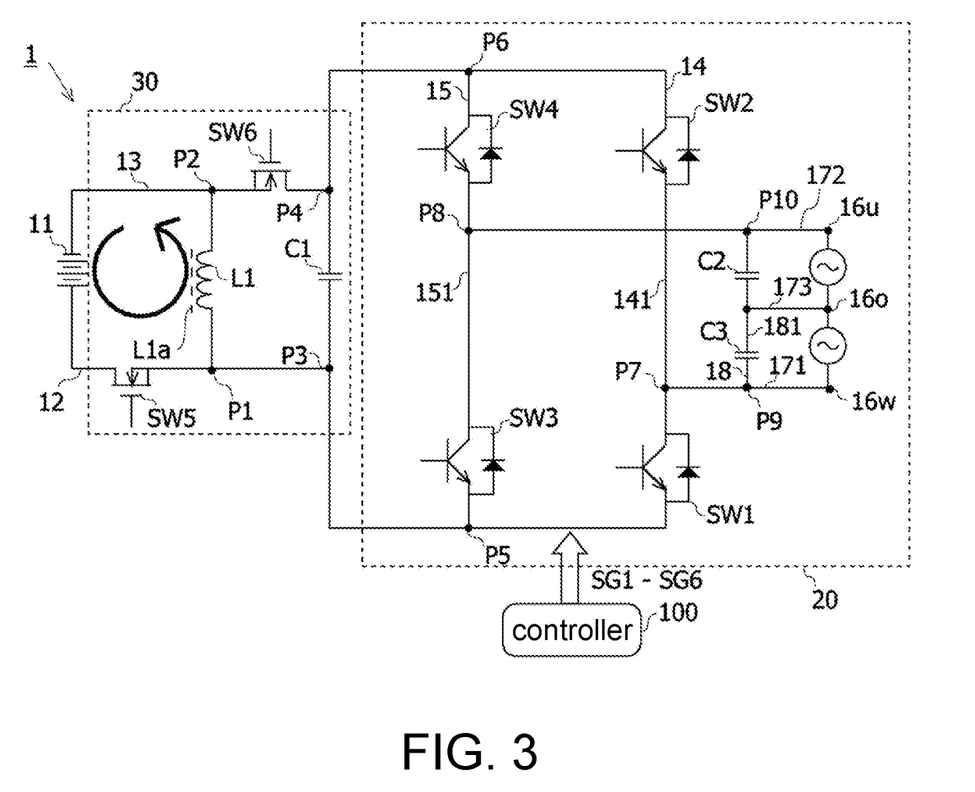
FIG. 3 is a diagram illustrating a first state of the power conditioner according to the embodiment.

FIG. 3 is a diagram illustrating a first state of the power conditioner according to the embodiment. In the first state, the controller 100 allows a DC current from the DC power source 11 to be supplied to the reactor L1 in the step-up/step-down circuit 30. The controller 100 causes the power conditioner to come into the first state where the fifth switching element SW5 is turned on in response to the control signal SG5 and the sixth switching element SW6 is turned off in response to the control signal SG6. In the first state, the DC current supplied from the DC power source 11 flows from the plus-side terminal of the DC power source 11 through the fifth switching element SW5 and the reactor L1 to the minus-side terminal of the DC power source 11. Thereby, energy is accumulated in the reactor L1, and supply of the DC current to the capacitor C1 is shut off.

Figure 4:
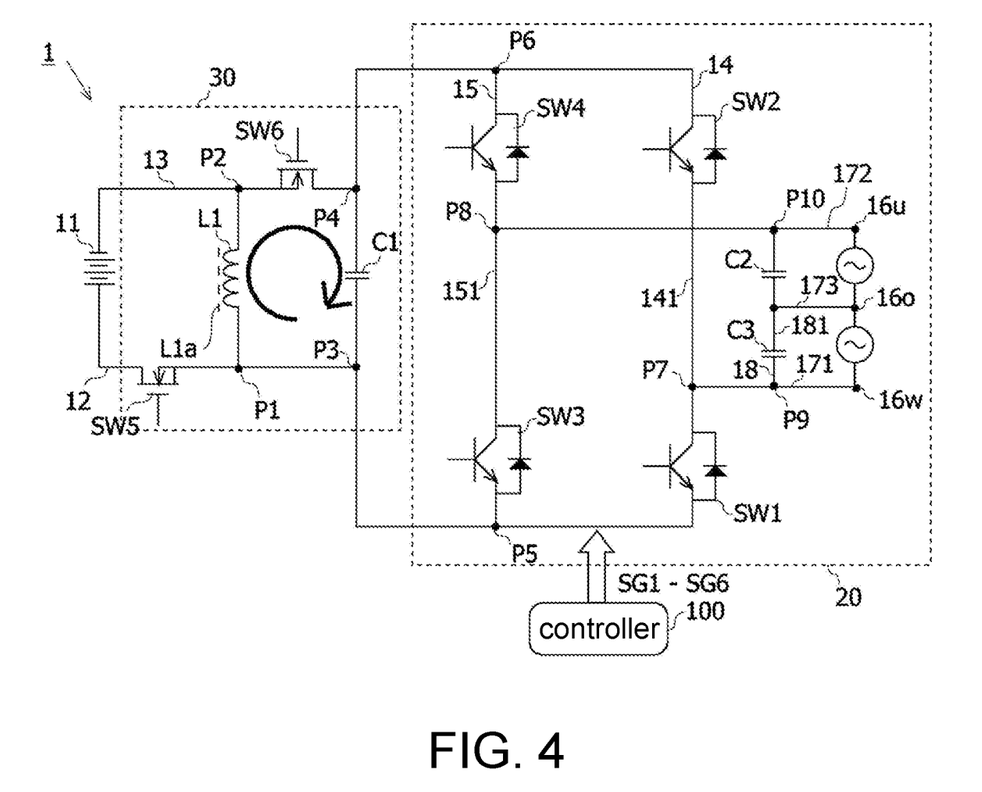
FIG. 4 is a diagram illustrating a second state of the power conditioner according to the embodiment.

FIG. 4 is a diagram illustrating a second state of the power conditioner according to the embodiment. In the second state, the controller 100 shuts off the supply of the DC current from the DC power source 11 to the reactor L1 in the step-up/step-down circuit 30. Further, the controller 100 releases the energy accumulated in the reactor L1 to thereby charge the capacitor C1 in the step-up/step-down circuit 30. In other words, the controller 100 causes the power conditioner to come into the second state where the fifth switching element SW5 is turned off in response to the control signal SG5 and the sixth switching element SW6 is turned on in response to the control signal SG6. In the second state, a DC current supplied from the DC power source 11 is shut off, and the energy accumulated in the reactor L1 in the first state is released as an electric current to charge the capacitor C1. As for a voltage of the DC power source 11 and a voltage with which the capacitor C1 is charged, for example, the following relationship of Expression (2) is established.

[Equation 2]

$$\frac{V_2}{V_1} = \frac{D_{on}}{(1 - D_{on})} \qquad \text{Expression (2)}$$

In Expression (2), $V_1$ represents a voltage of the DC power source 11, $V_2$ represents a voltage of the capacitor C1, and $D_{on}$ represents an ON duty of the fifth switching element SW5. In order to convert an electric current with which the capacitor C1 is charged into a full sine wave, $D_{on}$ may be determined from Expression (3).

[Equation 3]

$$D_{on} = \frac{|V_2 \sin \omega t|}{(V_1 + |V_2 \sin \omega t|)} \qquad \text{Expression (3)}$$

In Expression (3), w represents an angular frequency ($2\pi f$ represents a predetermined frequency (for example, 50 Hz or 60 Hz), and t represents time. In other words, the controller 100 controls the fifth switching element SW5 and the sixth switching element SW6 in a manner that the ON duty of the fifth switching element SW5 becomes $D_{on}$. In the power conditioner 1, when $D_{on}$ is higher than 0.5, stepping-up is performed, and when $D_{on}$ is lower than 0.5, stepping-down is performed. The step-up/step-down circuit 30 is an example of the "first switching circuit". The reciprocal number of $D_{on}$ is an example of a "first frequency".

Figure 5:
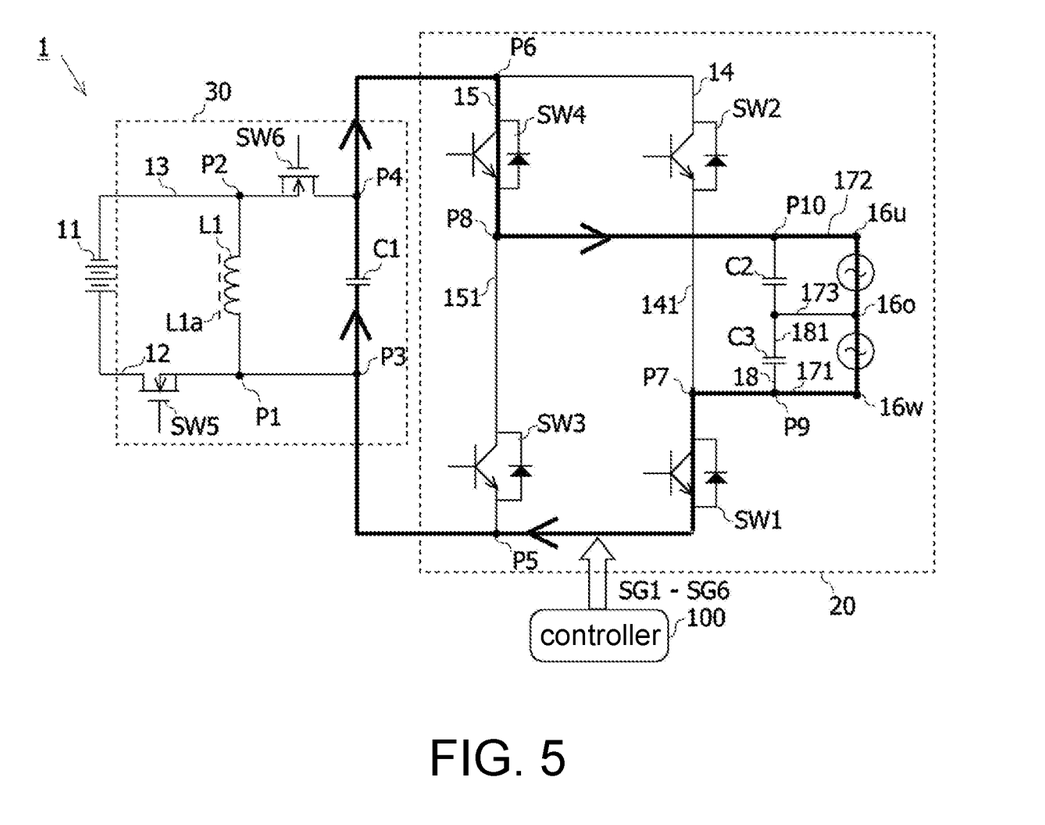
FIG. 5 is a diagram illustrating a third state of the power conditioner according to the embodiment.

FIG. 5 is a diagram illustrating a third state of the power conditioner according to the embodiment. In the third state, the controller 100 controls the switching elements in a manner that the electric current from the capacitor C1 flows in a direction from the u-terminal 16u toward the w-terminal 16w in the bridge circuit 20. The controller 100 causes the power conditioner to come into the third state where the second switching element SW2 is turned off in response to the control signal SG2 and the third switching element SW3 is turned off in response to the control signal SG3, and the first switching element SW1 is turned on in response to the control signal SG1 and the fourth switching element SW4 is turned on in response to the control signal SG4. In the third state, the capacitor C1 charged in the second state is discharged. An electric current generated by the discharge of the capacitor C1 flows to the capacitor C1 through the fourth switching element SW4, the u-terminal 16u, and the w-terminal 16w. The direction in which the electric current flows from the u-terminal 16u to the w-terminal 16w is an example of a "first direction".

Figure 6:
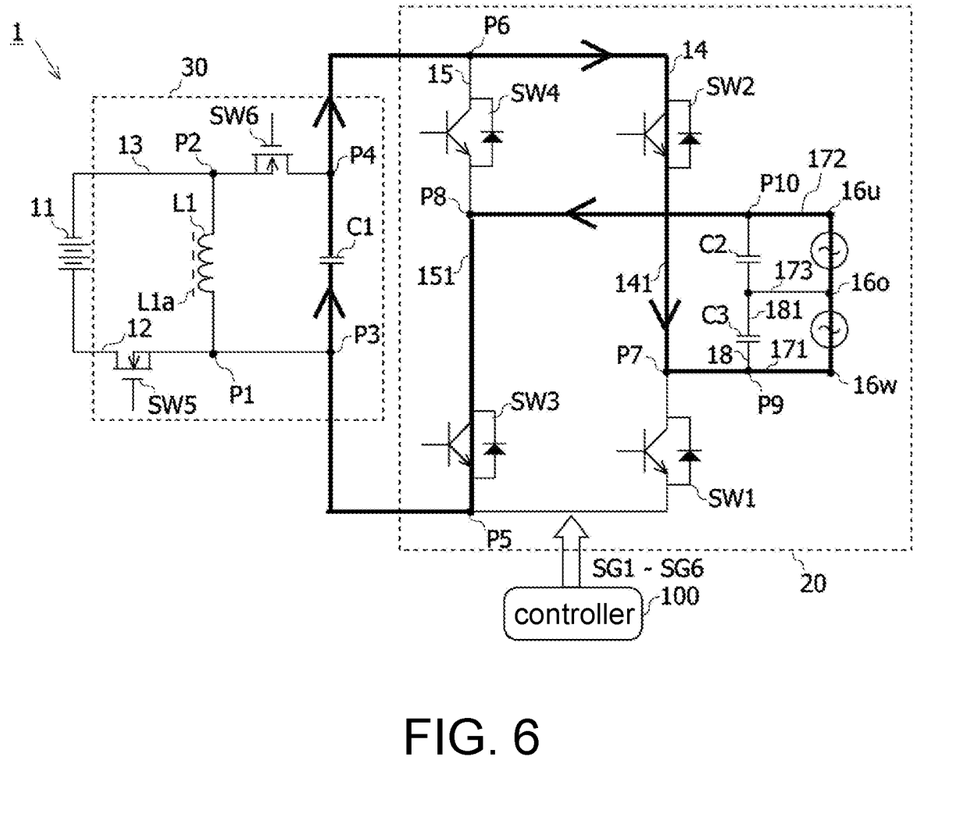
FIG. 6 is a diagram illustrating a fourth state of the power conditioner according to the embodiment.

FIG. 6 is a diagram illustrating a fourth state of the power conditioner according to the embodiment. In the fourth state, the controller 100 controls the switching elements in a manner that the electric current from the capacitor C1 flows in a direction from the w-terminal 16w toward the u-terminal 16u in the bridge circuit 20. The controller 100 causes the power conditioner to come into the fourth state where the first switching element SW1 is turned off in response to the control signal SG1 and the fourth switching element SW4 is turned off in response to the control signal SG4, and the second switching element SW2 is turned on in response to the control signal SG2 and the third switching element SW3 is turned on in response to the control signal SG3. In the fourth state, the capacitor C1 charged in the second state is discharged. The electric current discharged from the capacitor C1 flows to the capacitor C1 through the second switching element SW2, the w-terminal 16w, the u-terminal 16u, and the third switching element SW3. The direction in which the electric current flows from the w-terminal 16w to the u-terminal 16u is an example of a "second direction".

The controller 100 switches between the third state and the fourth state at the predetermined frequency f (frequency of AC power output by the power conditioner 1). As can be understood with reference to FIG. 5 and FIG. 6, electric currents output by the power conditioner 1 have reversed orientations in the third state and the fourth state. Therefore, the controller 100 switches between the third state and the fourth state at the frequency f, and thereby the power conditioner 1 can output AC power having the predetermined frequency f. The bridge circuit 20 is an example of the "second switching circuit". The predetermined frequency f is an example of a "second frequency".

<Simulation of Power Conditioner 1>

Figure 7:
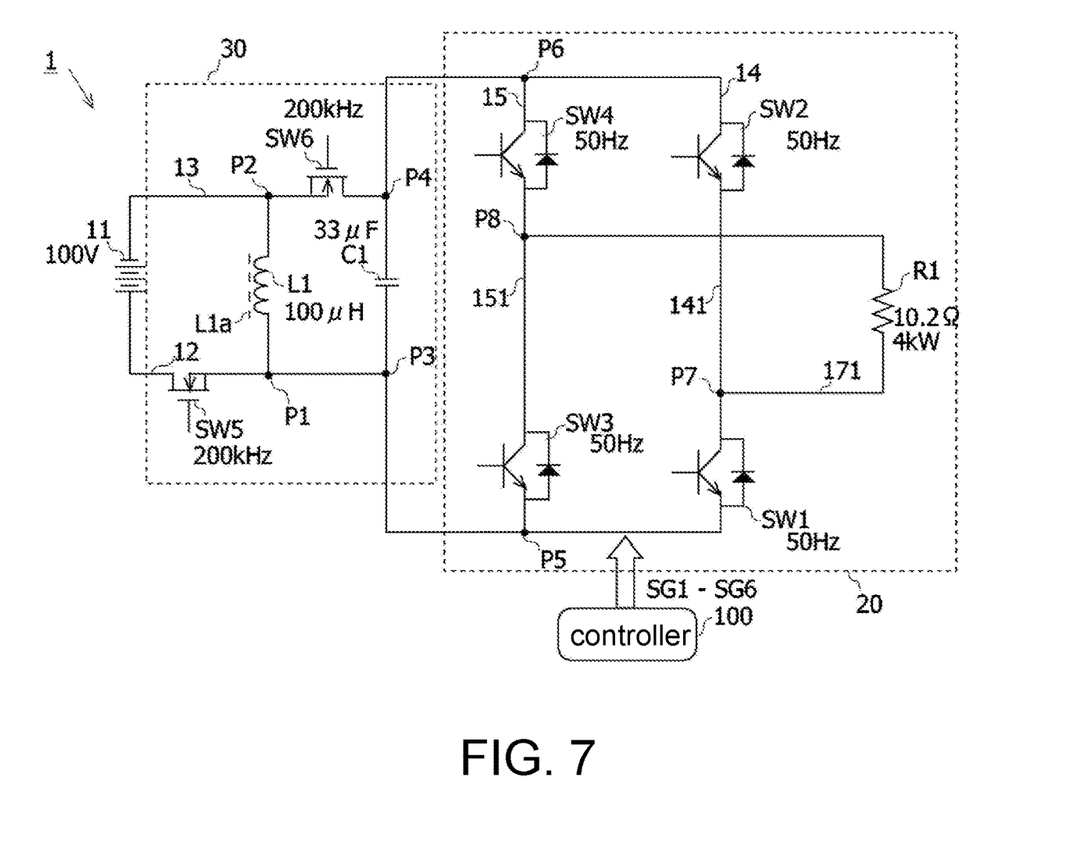
FIG. 7 is a diagram for showing a setting in a simulation of the power conditioner according to the embodiment.

The power conditioner 1 according to the embodiment was tested in a simulation, and the description thereof is as follows. FIG. 7 is a diagram for showing a setting in the simulation of the power conditioner according to the embodiment. As illustrated in FIG. 7, in the simulation, a voltage of the DC power source 11 was set to 100 V, inductance of the reactor L1 was set to 100 µH, and the capacitance of the capacitor C1 was set to 33 µF, and a resistor R1 having a resistance value of 10.2Ω was arranged as an output destination of the AC power.

In the simulation, the controller 100 switches between the first state and the second state at a frequency of 200 kHz. In other words, the controller 100 switches, at the frequency of 200 kHz, between the first state where the fifth switching element SW5 is turned on and the sixth switching element SW6 is turned off and the second state where the fifth switching element SW5 is turned off and the sixth switching element SW6 is turned on.

In addition, in the simulation, the controller 100 switches between the third state and the fourth state at a frequency of 50 Hz. In other words, the controller 100 switches, at the frequency of 50 kHz, between the third state where the second switching element SW2 and the third switching element SW3 are turned off and the first switching element SW1 and the fourth switching element SW4 are turned on and the fourth state where the first switching element SW1 and the fourth switching element SW4 are turned off and the second switching element SW2 and the third switching element SW3 are turned on.

Figure 8A:
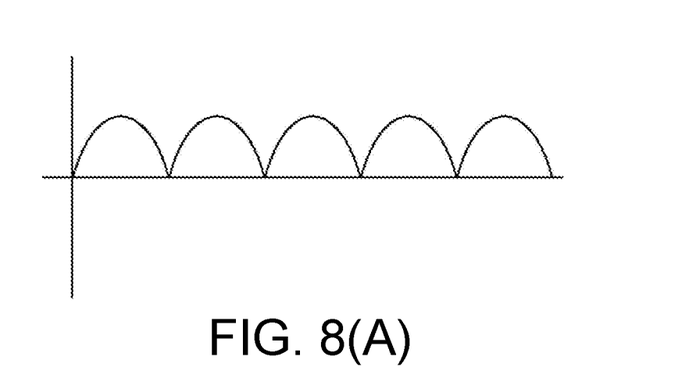
FIG. 8(A) to FIG. 8(C) are diagrams illustrating output waveforms from various positions of the power conditioner by the simulation.
Figure 8B:
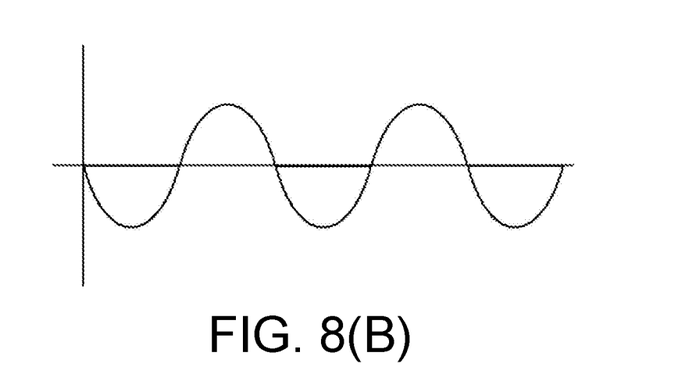
Figure 8C:
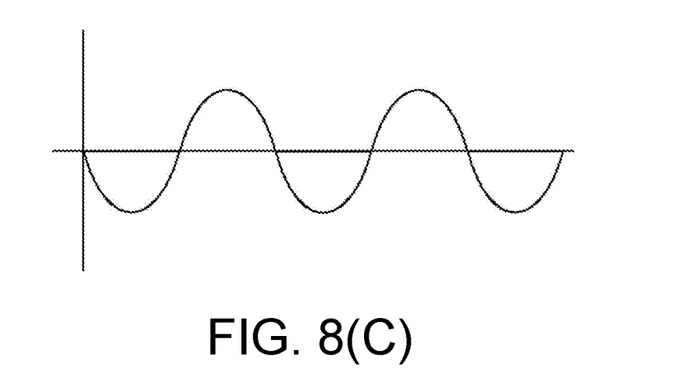

FIG. 8(A) to FIG. 8(C) are diagrams illustrating output waveforms from various positions of the power conditioner obtained by the simulation. FIG. 8(A) illustrates the voltage of the capacitor C1, FIG. 8(B) illustrates an output voltage of the power conditioner 1, and FIG. 8(C) illustrates an output current of the power conditioner 1. The vertical axis of FIGS. 8(A) and 8(B) represents a voltage value, and the vertical axis of FIG. 8(C) represents a current value. The horizontal axis of FIG. 8(A) to FIG. 8(C) represents time.

The following can be understood with reference to FIG. 8(A). The controller 100 switches between the first state and the second state at 200 kHz, and thereby a ripple current of the reactor L1 is removed by the capacitor C1 and a smooth full sine wave is generated. In addition, the following can be understood. The controller 100 switches between the third state and the fourth state at 50 Hz, and thereby AC power having a frequency of 50 Hz, an effective voltage of 202 Vrms, and electric power of 4 kW can be output.

Operation and Effect of Embodiment

As for the power conditioner 1 according to the embodiment, in the step-up/step-down circuit 30, the first state where the fifth switching element SW5 is turned on and the sixth switching element SW6 is turned off and the second state where the fifth switching element SW5 is turned off and the sixth switching element SW6 is turned on are alternately switched at the duty in accordance with the above Expression (3), and thereby the full sine wave is generated by the capacitor C1.

In the bridge circuit 20, in the third state where the first switching element SW1 and the fourth switching element SW4 are turned on and the second switching element SW2 and the third switching element SW3 are turned off, the electric current generated by the discharge of the capacitor C1 can flow in the first direction from the capacitor C1 through the u-terminal 16u, the o-terminal 16o, and the w-terminal 16w back to the capacitor C1. In addition, in the fourth state where the second switching element SW2 and the third switching element SW3 are turned on and the first switching element SW1 and the fourth switching element SW4 are turned off, the electric current generated by the discharge of the capacitor C1 can flow in the second direction from the capacitor C1 through the w-terminal 16w, the o-terminal 16o, and the u-terminal 16u back to the capacitor C1. The power conditioner 1 switches the direction in which the electric current generated by the discharge of the capacitor C1 flows between the first direction and the second direction at the predetermined frequency f, and thereby the power conditioner can output the AC current having the predetermined frequency.

According to the embodiment, the power conditioner 1 that does not include a plurality of reactors can convert a DC current supplied from the DC power source 11 into an AC current. In other words, the power conditioner 1 according to the embodiment can convert the input DC power into AC power and output the AC power even when a reactor other than the reactor L1 is not included. Therefore, the power conditioner 1 according to the embodiment is more advantageous in reducing a size, weight, and costs thereof than a power conditioner including a plurality of reactors.

Modification Example

Depending on a DC power source, a change in electric current when the first state and the second state are switched and a change in electric current in the first output wire and the second output wire cause a change in voltage of the DC power source in some cases. An example of a power source in which the change occurs includes a solar cell. In the modification example, a configuration for suppressing an influence of the change in electric current on the voltage of the DC power source is described.

Figure 9:
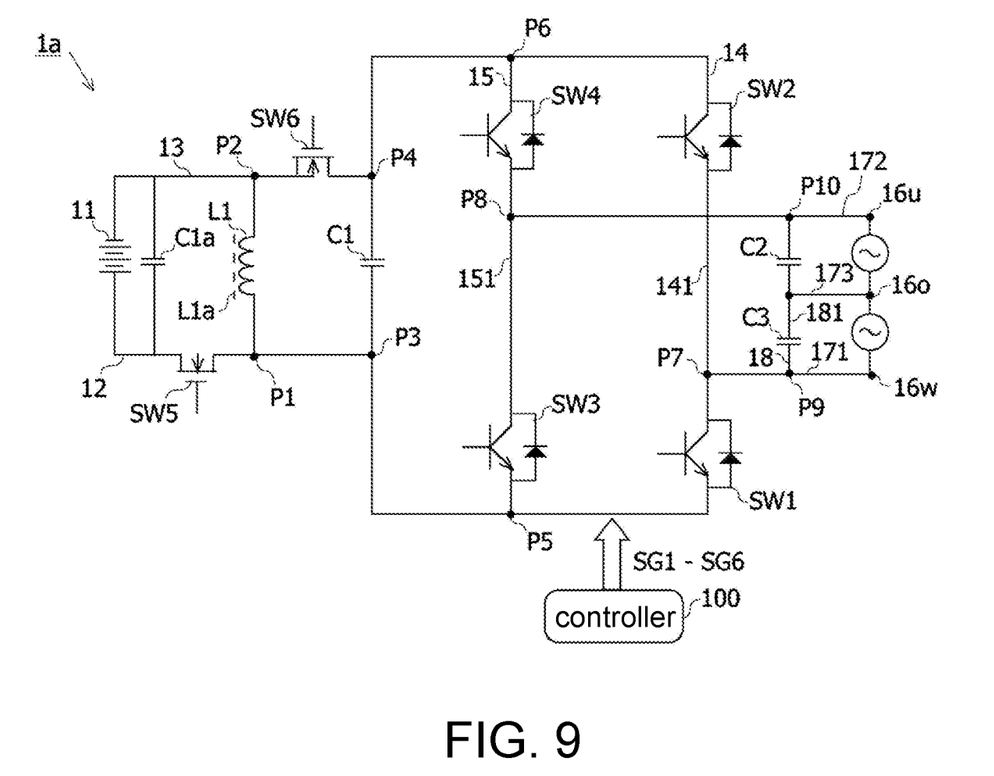
FIG. 9 is a diagram illustrating an example of a configuration of a power conditioner according to a modification example.

FIG. 9 is a diagram illustrating an example of a configuration of a power conditioner according to the modification example. A power conditioner 1a illustrated in FIG. 9 includes a smoothing capacitor C1a that is arranged between the plus wire 12 and the minus wire 13 to be closer to the DC power source 11 than the fifth switching element SW5 and smooths the voltage between the plus-side terminal and the minus-side terminal of the DC power source 11. By arranging the smoothing capacitor C1a as described above, the change in voltage of the DC power source 11 caused by the change in electric current when the first state and the second state are switched and the change in electric current in the first output wire and the second output wire is suppressed. The smoothing capacitor C1a is an example of a "second smoothing circuit".

The embodiment or the modification example disclosed above can be appropriately modified within a range without departing from the technical idea of the technology of the disclosure. For example, since it is sufficient that the sixth switching element SW6 can restrict an electric current flowing in a direction from the DC power source 11 through the first switching element SW1 to the capacitor C1, the sixth switching element may also be a diode which is arranged to restrict the electric current flowing in the direction.

APPENDIX

A power conditioner (1) that converts a DC current from a DC power source (11) into an AC current and outputs the AC current from an output terminal (16w, 16u, or 16o), the power conditioner (1) including: a reactor (L1);
a capacitor (C1);
a first switching circuit (30) that alternately switches, at a first frequency, between a first state where the DC current supplied from the DC power source (11) is supplied to the reactor (L1) and supply of the DC current to the capacitor (C1) is shut off and a second state where an electric current is supplied to the capacitor (C1) from the reactor (L1) in which energy is accumulated by the supply of the DC current and the electric current from the DC power source (11) to the reactor (L1) is shut off; and
a second switching circuit (20) that alternately switches, at a second frequency, between a first direction in which an electric current supplied from the capacitor (C1) flows toward a second output terminal (16w) through a first output terminal (16u) and a second direction in which the electric current flows toward the first output terminal (16u) through the second output terminal (16w).

According to the technology of the disclosure, in the first switching circuit, the energy is accumulated in the reactor in the first state, the energy accumulated in the reactor is released in the second state, and thereby the capacitor can be charged. The first state and the second state are alternately switched at the first frequency, and thereby a full sine wave is generated. An electric current due to the generated full sine wave is output by switching the first direction and the second direction at the second frequency by the second switching circuit, and thereby the electric current is output as the AC current. Here, the first frequency may be higher than the second frequency. According to the technology, since the power conditioner may include only one reactor, the power conditioner can be more small-sized and lightweight than a power conditioner including a plurality of reactors.

In order for a waveform generated by the capacitor to become a full sine wave, a duty $D_{on}$ in the first state where switching is performed at the first frequency may be determined from the following Expression (1), when $V_1$ represents a voltage of the DC power source, $V_2$ represents a voltage of the capacitor, and f represents the second frequency.

[Equation 1]

$$D_{on} = \frac{|V_2 \sin 2\pi f t|}{(V_1 + |V_2 \sin 2\pi f t|)} \quad \text{Expression (1)}$$

In addition, the power conditioner may further include a controller that controls the switching performed by the first switching circuit and the second switching circuit.

The power conditioner described above may be specified by the following configuration. The second switching circuit includes: a plus wire and a minus wire which are connected to a plus-side terminal and a minus-side terminal of the DC power source, respectively; a first leg that is disposed between the plus wire and the minus wire and connects a first switching element and a second switching element in series; a second leg that is disposed between the plus wire and the minus wire to be closer to the DC power source than the first leg and connects a third switching element and a fourth switching element in series; a first output wire having one end connected to a first in-leg wiring which connects the first switching element and the second switching element of the first leg; a second output wire having one end connected to a second in-leg wiring which connects the third switching element and the fourth switching element of the second leg; and a first smoothing circuit that is disposed between the first output wire and the second output wire and smooths a voltage between the first output wire and the second output wire. The first switching circuit includes: the capacitor that is disposed between the plus wire and the minus wire and is disposed closer to the DC power source than the second leg; the reactor that is disposed between the plus wire and the minus wire and is disposed closer to the DC power source than the capacitor; a fifth switching element that is disposed on the plus wire and between the DC power source and a first connection point at which the plus wire is connected to the reactor, and a sixth switching element that is disposed on the minus wire and between a second connection point at which the minus wire is connected to the reactor and a third connection point at which the minus wire is connected to the capacitor.

According to the power conditioner having the above configuration, in the first switching circuit, the fifth switching element is turned on and the sixth switching element is turned off, and thereby the above-described first state is realized. Then, the fifth switching element is turned off and the sixth switching element is turned on, and thereby the above-described second state is realized. In addition, in the second switching circuit, the first switching element and the fourth switching element are turned on and the second switching element and the third switching element are turned off, and thereby the electric current can flow from the capacitor in the first direction described above. Then, by turning on the second switching element and the third switching element and turning off the first switching element and the fourth switching element, the electric current can flow from the capacitor in the second direction described above.

The technology of the disclosure may have the following characteristics. The power conditioner further includes a second smoothing circuit that is disposed between the plus wire and the minus wire to be closer to the DC power source than the reactor and smooths a voltage between the plus-side terminal and the minus-side terminal of the DC power source. Depending on the DC power source, a change in electric current when the first state and the second state are switched and a change in electric current in the first output wire and the second output wire cause a change in voltage of the DC power source, in some cases. By arranging the second smoothing circuit, it is possible to suppress the change in voltage of the DC power source.

The power conditioner can be further reduced in size and weight.

What is claimed is:
1. A power conditioner that converts a DC current from a DC power source into an AC current and outputs the AC current from an output terminal, the power conditioner comprising:
a reactor;
a capacitor;

a first switching circuit that alternately switches, at a first frequency, between a first state where the DC current supplied from the DC power source is supplied to the reactor and a supply of the DC current to the capacitor is shut off and a second state where an electric current is supplied to the capacitor from the reactor in which an energy is accumulated by the supply of the DC current and an electric current from the DC power source to the reactor is shut off; and a second switching circuit that alternately switches, at a second frequency, between a first direction in which an electric current supplied from the capacitor flows toward a second output terminal through a first output terminal and a second direction in which the electric current flows toward the first output terminal through the second output terminal.

2. The power conditioner according to claim 1, wherein a duty $D_{on}$ in the first state where switching is performed at the first frequency is determined from Expression (1), when $V_1$ represents a voltage of the DC power source, $V_2$ represents a voltage of the capacitor, and f represents the second frequency

[Equation 1]

$$D_{on} = \frac{|V_2 \sin 2\pi ft|}{(V_1 + |V_2 \sin 2\pi ft|)}. \quad \text{Expression (1)}$$

3. The power conditioner according to claim 1, further comprising:
a controller that controls the switching performed by the first switching circuit and the second switching circuit.

4. The power conditioner according to claim 1, wherein the second switching circuit comprises:
a plus wire and a minus wire which are connected to a plus-side terminal and a minus-side terminal of the DC power source, respectively;
a first leg that is disposed between the plus wire and the minus wire and connects a first switching element and a second switching element in series;
a second leg that is disposed between the plus wire and the minus wire to be closer to the DC power source than the first leg and connects a third switching element and a fourth switching element in series,
a first output wire having one end connected to a first in-leg wiring which connects the first switching element and the second switching element of the first leg;
a second output wire having one end connected to a second in-leg wiring which connects the third switching element and the fourth switching element of the second leg; and
a first smoothing circuit that is disposed between the first output wire and the second output wire and smooths a voltage between the first output wire and the second output wire; and
wherein the first switching circuit comprises:
the capacitor that is disposed between the plus wire and the minus wire and is disposed closer to the DC power source than the second leg;
the reactor that is disposed between the plus wire and the minus wire and is disposed closer to the DC power source than the capacitor;
a fifth switching element that is disposed on the plus wire and between the DC power source and a first connection point at which the plus wire is connected to the reactor; and
a sixth switching element that is disposed on the minus wire and between a second connection point at which the minus wire is connected to the reactor and a third connection point at which the minus wire is connected to the capacitor.

5. The power conditioner according to claim 4, further comprising:
a second smoothing circuit that is disposed between the plus wire and the minus wire to be closer to the DC power source than the reactor and smooths a voltage between the plus-side terminal and the minus-side terminal of the DC power source.

6. The power conditioner according to claim 2, further comprising:
a controller that controls the switching performed by the first switching circuit and the second switching circuit.

7. The power conditioner according to claim 6, wherein the second switching circuit comprises:
a plus wire and a minus wire which are connected to a plus-side terminal and a minus-side terminal of the DC power source, respectively;
a first leg that is disposed between the plus wire and the minus wire and connects a first switching element and a second switching element in series;
a second leg that is disposed between the plus wire and the minus wire to be closer to the DC power source than the first leg and connects a third switching element and a fourth switching element in series,
a first output wire having one end connected to a first in-leg wiring which connects the first switching element and the second switching element of the first leg;
a second output wire having one end connected to a second in-leg wiring which connects the third switching element and the fourth switching element of the second leg; and
a first smoothing circuit that is disposed between the first output wire and the second output wire and smooths a voltage between the first output wire and the second output wire; and
wherein the first switching circuit comprises:
the capacitor that is disposed between the plus wire and the minus wire and is disposed closer to the DC power source than the second leg;
the reactor that is disposed between the plus wire and the minus wire and is disposed closer to the DC power source than the capacitor;
a fifth switching element that is disposed on the plus wire and between the DC power source and a first connection point at which the plus wire is connected to the reactor; and
a sixth switching element that is disposed on the minus wire and between a second connection point at which the minus wire is connected to the reactor and a third connection point at which the minus wire is connected to the capacitor.

8. The power conditioner according to claim 7, further comprising:
a second smoothing circuit that is disposed between the plus wire and the minus wire to be closer to the DC power source than the reactor and smooths a voltage between the plus-side terminal and the minus-side terminal of the DC power source.

* * * * *